May 27, 1941.   G. H. JOHNSON   2,243,379
MACHINE TOOL
Filed Nov. 24, 1937   6 Sheets-Sheet 1

Fig. 1.

INVENTOR
George H. Johnson
BY
Fred G. Parsons
ATTORNEY

May 27, 1941.  G. H. JOHNSON  2,243,379
MACHINE TOOL
Filed Nov. 24, 1937  6 Sheets-Sheet 4

INVENTOR
George H Johnson
BY
Fred G Parsons
ATTORNEY

Patented May 27, 1941

2,243,379

UNITED STATES PATENT OFFICE 2,243,379

MACHINE TOOL

George H. Johnson, Madison, Wis., assignor to Gisholt Machine Company, Madison, Wis., a corporation of Wisconsin Application November 24, 1937, Serial No. 176,177

27 Claims. (Cl. 77—5)

This invention relates to a machine tool for correction of unbalance in rotatable work pieces.

Where unbalance is present in a rotating part, the part tends to be distorted and also vibrate or oscillate in its supporting bearings. Such results are very objectionable in any event, and if the period of unbalance vibration happens to correspond to a natural period of vibration in the supporting structure the effect may be greatly amplified.

In some balancing machines, usually by reason of lack of sensitiveness of the unbalance measuring portions, the measurements must be made at a so called critical speed of rotation of the part being measured, at which the unbalance sets up a vibration corresponding to the natural period of vibration of the support. This method has a variety of objections and limitations, and at best does not result in a degree of accuracy which is satisfactory for many purposes.

A purpose of the invention is to provide an improved machine having portions adjustable in accordance with unbalance present in a work piece, and other portions which are controlled in accordance with such adjustment for correcting the unbalance, whereby the product of the machine is a balanced work piece.

A further purpose is to provide such a machine in which the effect of the unbalance present in the work piece may be magnified or amplified to any desired extent at any rotational speed of the work piece, whereby to obtain a maximum degree of accuracy in the control of the other portions of the machine and a maximum degree of accuracy in unbalance correction, without resort to so called critical speeds.

A further purpose is to provide an unbalance correction machine in a generally simplified and improved form, both as to the construction and operation thereof, and various other purposes will be apparent from the specification.

The invention consists of the construction and combination of parts as herein illustrated, described and claimed, and in such modifications thereof as may be equivalent to the claims.

Throughout the specification the same reference characters have been used to indicate the same parts, and in the drawings.

Figure 1:
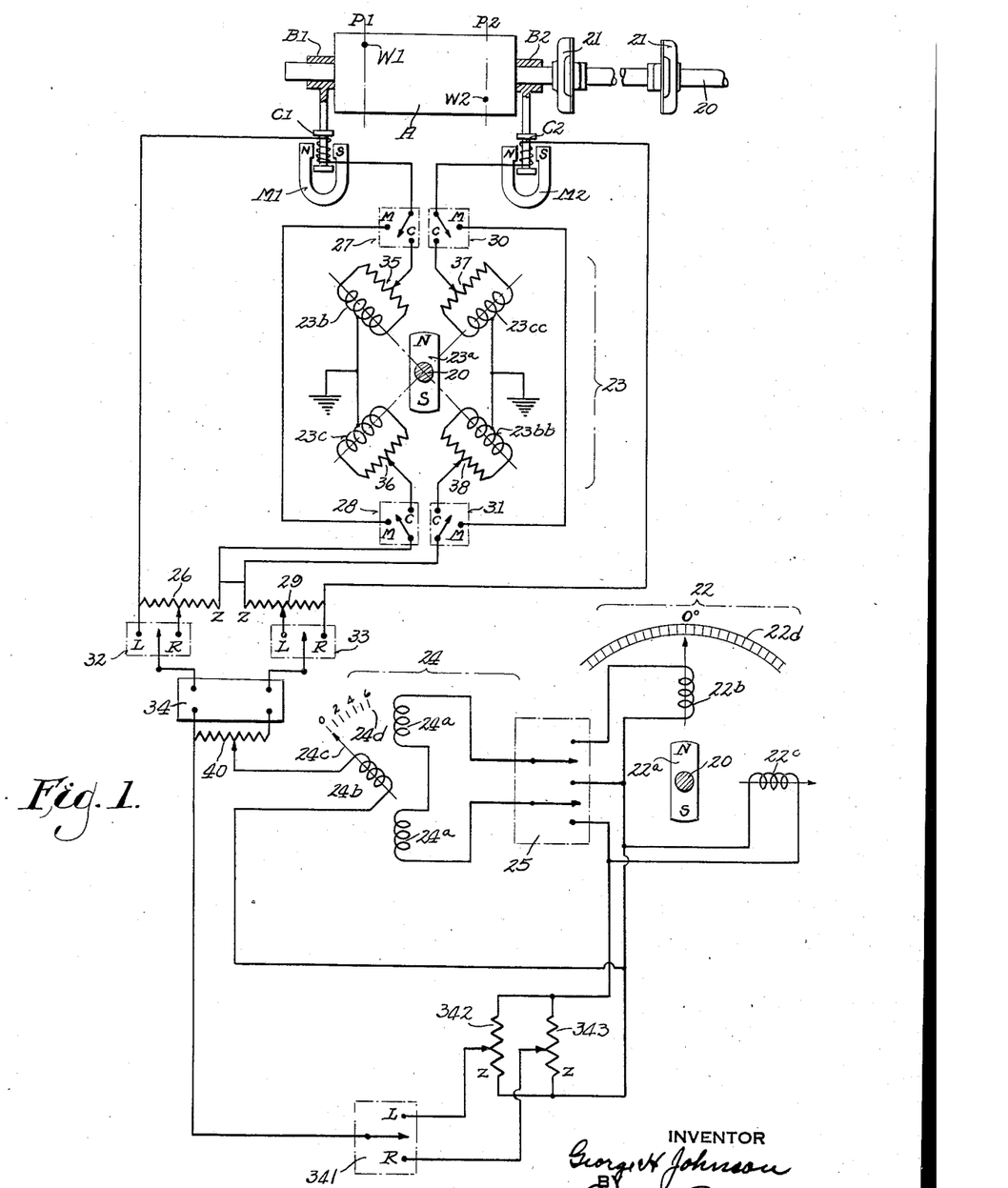
Figure 1 is a diagrammatic representation of a simplified form of a device having portions adjustable in accordance with unbalance present in a work piece and which may be used for controlling other portions in a machine for practicing the invention.
Figures 2, 3:
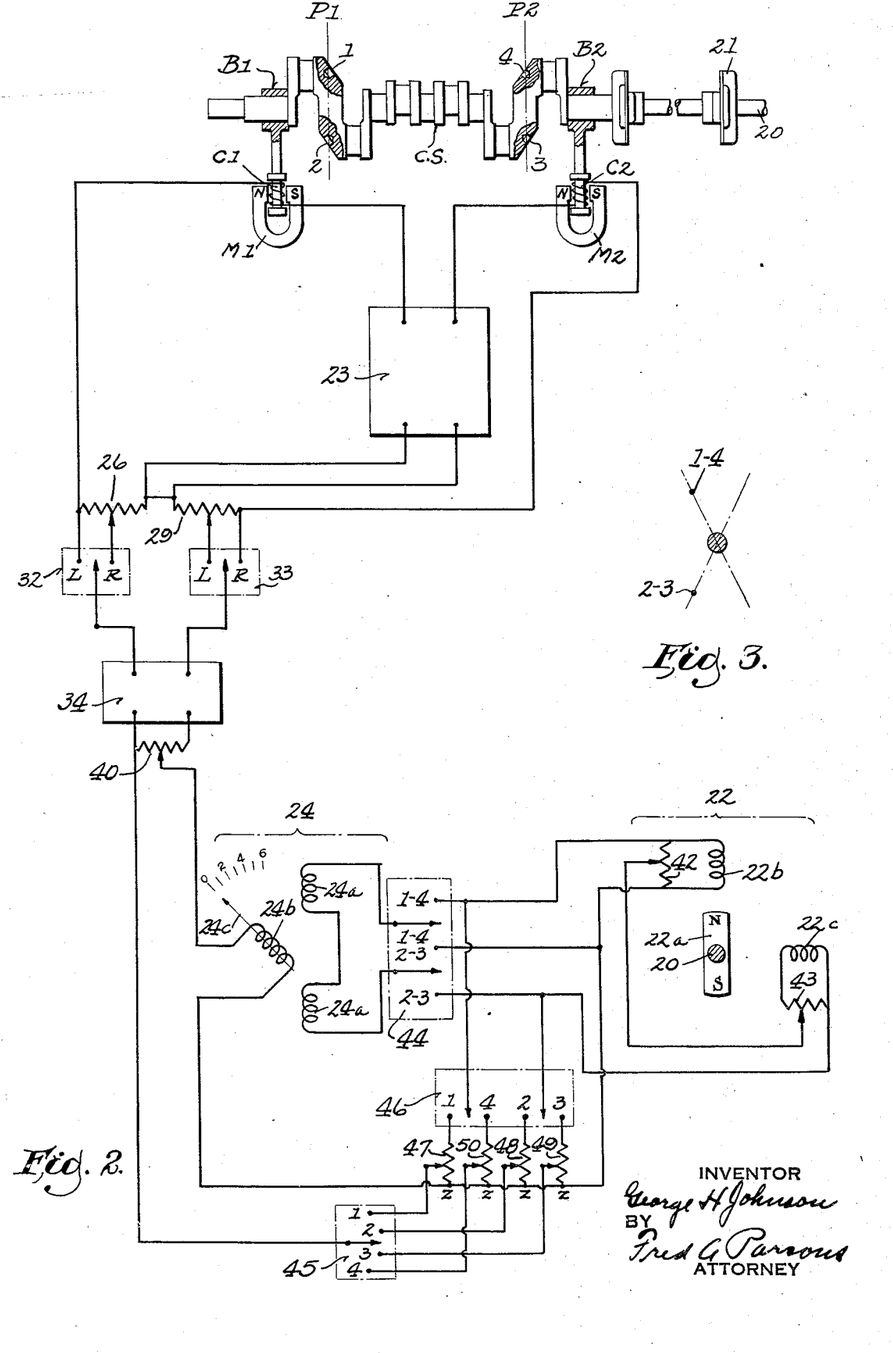
Figure 2 is a diagrammatic representation of a device similar to that of Fig. 1, with certain modifications and additions.
Figure 3 is a diagram indicating the relation of unbalance correction points for the work piece associated with the device of Fig. 2.

In the machines here described the unbalance responsive devices of Figs. 1, 2 will be understood to be illustrative of different modifications suited for use more especially where the unbalance correction is to be effected by removal of metal at correction points located between spaced bearings. Other conditions may require other modifications.

When an unbalanced work piece is rotated on a horizontal axis between two spaced bearings which are yieldably supported, as by suitable springs, to permit oscillation in only the horizontal axial plane, the unbalance causes oscillation of both the supporting bearings. The amplitude of oscillation of each bearing, with certain correction later explained, is proportional to the component of unbalance acting thereon, and the oscillation may be measured to determine the amount and angular position of material to be removed, or added, in spaced correction planes, such as the transverse planes P1, P2, Fig. 1, respectively adjacent the different bearings, in order to balance the work piece.

The diagram, Fig. 1, shows a device in which such measurements can be made. The work piece A is rotatably supported between the bearings B1, B2, which are each supported by suitable springs, not shown, for independent oscillation limited to the horizontal plane. The work piece is rotated from a drive shaft 20, which is driven from a suitable power source, not shown, there being coupling devices 21, 21 of any suitable form to permit the bearing oscillation and to transmit power for the work piece rotation without setting up lateral forces. Pick up coils C1, C2, are fixed for oscillation with the respective bearings and move in the field of permanent magnets M1, M2. When unbalance exists in the rotating work piece A this arrangement generates a cycle of alternating current in each of the pick up coils C1, C2 at each revolution of the shaft 20. Associated with the drive shaft 20 there is a measuring generator, denoted in entirety by the numeral 22, and also a compensating generator denoted in entirety by the numeral 23, the generators respectively including the permanent magnets 22a, 23a each fixed with shaft 20 with their similar poles extending in the same direction.

Measuring generator 22, Fig. 1, includes the magnet 22a and two coils 22b, 22c fixed at 90° relative angular spacing but unitarily angularly adjustable about the axis of shaft 20 in either direction, the position of angular adjustment being read against a suitable fixed scale 22d. Each rotation of shaft 20 generates a cycle of alternating current in each coil 22b, 22c, the currents being 90° out of phase in the different coils.

Compensating generator 23 has two sets of coils in fixed angular position, including a first set of coils 23b and 23c at 90° angle to one another and a second set 23bb, 23cc also at 90° angle to one another. Each rotation of shaft 20 generates a cycle of alternating current in each coil 23b, 23c, 23bb, 23cc having a predetermined phase relationship to the currents generated in the coils of measuring generator 22 when the measuring generator is set in its zero degree position on scale 22d.

A wattmeter, denoted in entirety by the numeral 24, Fig. 1, includes a stationary winding 24a and a winding 24b pivotally movable with a pointer 24c which operates against a scale 24d. A reversing switch, not shown, of any suitable type may be added to reverse the current to the winding 24b. A switch 25 may be adjusted to alternatively connect either coil 22b, 22c of the measuring generator to supply current to the stationary coil 24a of the wattmeter.

It will be understood that the work piece A is fixed for revolution in known angular relation to shaft 20 as, for example, in respect of a specific configuration or marking on the work piece, thereby establishing a known angular relationship of the work piece to the magnet 22a of the measuring generator. The angular position of an unbalance component such as W1, W2, Fig. 1 may be initially unknown, but the axial plane in which the unbalance component acts may be ascertained by the point in the revolution of shaft 20 where the unbalance component produces maximum oscillatory movement of the associated bearing B1 or B2 in the plane of oscillation of the bearings and, by comparing the angular phase relationship of the currents respectively generated in the associated pick up coil C1 or C2 and in the measuring generator coils 22b or 22c the direction of the unbalance component from the axis of the work piece is determined in said axial plane, thereby completely determining its angular position. In the measuring generator 22 the scale 22d affords a convenient means of indicating the angular position of the generator magnet 22a at the time when the current from a pick up coil is in predetermined phase relation with the current from one of the measuring generator coils, as will be later explained, thereby determining the angular position in the work piece of the unbalance component, and also of the necessary correction component, the position of the correction corresponding to the unbalance position if the correction is to be effected by removal of material from the work piece, or being 180° removed therefrom if the correction is to be effected by addition of material.

The pick up coil C1, Fig. 1, may be connected in series with a potentiometer 26, either to exclude or include the coils 23b, 23c of the compensating generator 23, by the means of switches 27, 28. Similarly the pick up coil C2 may connect with a potentiometer 29, either to exclude or include the coils 23bb, 23cc of the compensating generator, by the means of switches 30, 31. Other switches 32, 33 respectively control the alternative connection of the potentiometers 26, 29 to the movable coil 24b of the wattmeter, the connection being through an amplifier device, denoted in entirety by the numeral 34, which may be of a well known form using thermionic tubes to amplify the current from the potentiometers 26, 29 to any desired degree and, by the means of a switch 341 may alternatively include the one or the other of the potentiometers 342, 343. The coils 23b, 23c, 23bb, 23cc of the compensating generator are respectively connected through potentiometers 35, 36, 37, 38, the connection being such that the potentiometer of each coil may be adjusted for opposing the current generated in the associated pick up coils C1, C2, for reasons later explained.

For measuring the amount and angular position of unbalance corrections necessary in each of the spaced correction planes P1, P2 of an unbalanced work piece A, Fig. 1, it is first necessary to adjust and calibrate the machine. It will be understood that the operation of adjusting and calibrating which follows, assumes that any necessary unbalance corrections will be made in the spaced correction planes P1, P2. The axial position of these planes may be arbitrarily selected to suit the work piece, but any change in the position of the correction planes requires another adjustment and calibration for the new planes. The operation of adjustment and calibration may be simplified, as later explained, if a perfectly balanced work piece is initially available, but where only an unbalanced work piece is available the operation is as follows:

It is first necessary to eliminate in each of the pick up coils C1, C2 all electrical effect of initial unbalance in the work piece. To eliminate such electrical effect in the circuit of pick up coil C1, Fig. 1, the switches 27, 28 are each set in the compensating positions indicated as C, the potentiometers 26, 29, 342, 343 are each adjusted to the position marked Z, and the switches 32, 33, 341 are each adjusted to the position marked L. In such arrangement the left hand pick up coil C1 and the set of coils 23b, 23c are collectively delivering current through the amplifier 34 to the movable coil 24b of the wattmeter. The measuring generator 22 is then adjusted for the coil 22b to angularly correspond to coil 23b of the compensating generator. In this position, by adjusting switch 25 to successively connect the measuring generator coils 22b, 22c to the wattmeter, the potentiometers 35, 36 may be successively adjusted in the different switch positions to respectively exactly oppose the two 90° components of the current generated in pick up coil C1, the point of exact opposition being indicated in each instance by a zero reading of the wattmeter 24. The compensating coils 23b, 23c will then be exactly opposing the current generated in pick up coil C1 by the oscillation of bearing B1 due to unbalance in the work piece A.

Similarly, to eliminate the electrical effect in the circuit of pick up coil C2 of all initial unbalance in the work piece A, the switches 30, 31 are adjusted to the compensating position C, the potentiometers 26, 29, 342, 343 remaining in the position Z. The switches 32, 33, 341 are adjusted to the position marked R, whereby the circuit of the right hand pick up coil C2 includes the coils 23bb, 23cc of the compensating generator and is delivering current through amplifier 34 to the movable coil 24b of the wattmeter. The measuring generator 22 remains in its previous angular position. By manipulation of switch 25 as before the potentiometers 37, 38, may be adjusted one after the other to exactly oppose each of the two 90° current components in coil C2.

To next adjust the device of Fig. 1 for the compensation or elimination in coil C1 of any effect created by an unbalance component referred for correction to the plane P2 the switches etc. are positioned the same as for the previous serial connection of coils C1, 23b, 23c to the wattmeter 24, the potentiometers 35, 36, 37, 38 remaining in the position previously determined, and the measuring generator 22 is set at its zero degree position. An artificial unbalance W2 is then added in the correction plane P2 in such angular relation with the shaft 20 and with magnet 22a as to result in additional current in the pick up coil C1 which is exactly in phase with the current in the coil 22b of the measuring generator. The artificial unbalance W2 also causes additional current in the nearest adjacent coil C2 of larger value and opposite in direction, that is to say 180° out of phase, to the additional current in coil C1. The potentiometer 29 is then adjusted from its Z position to a position opposing the additional current generated in coil C1 by a portion of the additional current generated in coil C2, sufficient to exactly eliminate the additional current generated in coil C1 by the artificial unbalance W2, the correct position of the potentiometer 29 being indicated by a zero reading of the wattmeter with the coil 22b connected to the stationary coil 24a of the wattmeter.

For a similar compensation or elimination in the circuit of coil C2, the switches, potentiometers, etc. are positioned as for the previous serial connection of coils C2, 23bb, 23cc to the wattmeter, the measuring generator 22 remaining in zero degree position, the artificial unbalance W2 is removed, an artificial unbalance W1 is added in the plane P1 in an angular position to effect additional current in coil C2 which is exactly in phase with the current in coil 22b of the measuring generator, and the potentiometer 26 is adjusted from its position Z to oppose the additional current generated in coil C2 with a portion of the additional current generated in coil C1, sufficient to exactly eliminate such additional current in coil C2.

It will be understood that, if a perfectly balanced work piece is available in the first instance, the potentiometers 26, 29 may be adjusted as just described without first adjusting the compensating generator 23 to eliminate the effect of initial unbalance. In such case the potentiometers 26, 29 are adjusted with the switches 27, 28 and 30, 31 in the measuring position marked M, which eliminates the compensating generator 23 from the circuit of the pick up coils C1, C2.

After the adjustment of potentiometers 26, 29 as above described, the artificial unbalances W1, W2 being removed, the device is ready for use for separately measuring the corrections necessary in the respective correction planes P1, P2 to effect a balanced work piece. In subsequent explanation the unbalance to be corrected will, for convenience, be referred to as if it consisted of two separate unbalances, respectively located in the different correction planes P1, P2. To effect the measurement of these unbalances the compensating generator 23 is eliminated from the circuit of pick up coils C1, C2 by adjusting the switches 27, 28, 30, 31 to the measuring position marked M, the potentiometers 26, 29 remain in the position eliminating in each pick up coil the effect of unbalance referred for correction to the other pick up coil, obtained as previously described, and the operation proceeds as follows:

For measurement of the amount and angular position of unbalance in correction plane P1, the switches 32, 33, 341 are each adjusted to the left hand position L, in which the movable coil of wattmeter 24 will receive the amplified current delivered to amplifier 34 from pick up coil C1. To obtain the angular position of such unbalance, the switch 25 is adjusted to deliver to the stationary coil of the wattmeter the current generated in coil 22c of the measuring generator and the coils of the measuring generator 22 are then angularly adjusted to a point where there is a zero reading of the wattmeter. The angular position of the generator then determines the angular position of the unbalance in plane P1 with reference to generator magnet 22a and therefore to the work piece A which is fixed to revolve therewith. The unbalance can now be measured by leaving the measuring generator in the same position and adjusting switch 25 to connect coil 22b to the wattmeter. The current generated in coil 22b will be exactly in phase with the current from amplifier 34 and the wattmeter deflection will be exactly proportional to the unbalance in the correction plane P1.

Proceeding similarly, but with the switches 32, 33, 341 in the right hand position R, the amount and angular position of the unbalance in the correction plane P2 may be measured.

The deflection of the wattmeter 24, in the device of Fig. 1, during measurements of unbalance as above described, is proportionate to the product of the weight and effective radius of the unbalance. For convenience in correcting unbalance it is desirable that the wattmeter readings should be reducible to suitable units of weight-radius such, for example, as ounce-inches, whereby a known weight of correction material may be removed at a preferred radius for correcting the unbalance. The proper factors for changing the wattmeter readings to units of weight-radius may be determined by using artificial unbalances such as W1, W2 of known weight acting at a known radius and proceeding to measure the wattmeter deflection caused by the artificial unbalances in the same manner as in the measuring operation previously described.

The wattmeter may be calibrated for a preferred relationship or range of readings by adjusting suitable calibrating potentiometers such as 40. For simplicity only one calibration potentiometer 40 is shown in the drawings, Fig. 1, but there will ordinarily be a separate calibration potentiometer for each correction plane, the different potentiometers being thrown into the wattmeter circuit by suitable switches, not shown, according to the plane in which unbalance is being measured. Such potentiometers may be adjusted to obtain wattmeter readings directly in terms of weight to be eliminated, or in some instances added, in each correction plane at a preferred radius.

It will be noted that in the operation of the device of Fig. 1, as thus far described the potentiometers 342, 343 have remained in their Z position, and in such position are of no effect. But if, during the measurement of the amount of unbalance in the plane P1, and while the wattmeter 24 is indicating the amount of the unbalance, the potentiometer 342 is adjusted out of its Z position, a position of its adjustment will be found in which the current delivered to the wattmeter by the coil C1 is exactly overcome by an equal and opposite current from the measuring generator coil 22c, the required position being indicated by a reduction of the wattmeter reading to zero. The amount of unbalance is then indicated by the amount of adjustment of the potentiometer necessary to effect the zero wattmeter reading. Similarly the adjustment of potentiometer 343 may be used to indicate the amount of unbalance in the plane P2. The purpose of potentiometers such as 342, 343 will later be more fully explained.

For some work pieces the measuring device previously described may be modified as shown in the diagram of Fig. 2 to permit determination and correction of unbalance at predetermined points as, for example, the correction points 1, 2, 3, 4, Fig. 2, the correction points in this instance being such as might be used for balancing a crank shaft C. S., in which the correction points 1, 4, are located in the same axial plane, as indicated in Fig. 3, and the points 2, 3 are in another axial plane, at predetermined angular distance from the plane of points 1, 4. In such case the work piece may be fixed for rotation with shaft 20 for the axial planes 1—4 and 2—3 to be in predetermined angular position relative to the magnet 22a of the measuring generator, there being suitable locating means, not shown, for locating the work piece in such position, whereby it is unnecessary to measure the angular position of the several unbalances. It will be understood that while it is necessary, in order to avoid measurement of the angular position of the correction points 1, 2, 3, 4, Fig. 2, in the manner later described, that they be positioned in two axial planes as shown in Fig. 3, it is not necessary that the points 1, 2 be in the same correction plane P1, or that the points 3, 4 be in the same plane P2. The correction points may each be located in different correction planes, as later referred to. Also it is not necessary that the correction points be at equal radial distance from the axis.

In the device of Fig. 2 the preliminary adjustment, when necessary for elimination of the effect of all initial unbalance in the work piece C. S., is obtained by adjustment of a compensating generator 23 in the same manner as described for the device of Fig. 1, and therefore the compensating generator 23 of Fig. 2 has not been shown in detail. The compensating potentiometers 26, 29 are adjusted in the same manner as described for the machine of Fig. 1, but if the correction points of the pair 1, 2 or of the pair 3, 4 are in different correction planes, which they may be as previously pointed out, it will be necessary to provide additional compensating potentiometers and suitable switches therefor, not shown, whereby to provide a separate potentiometer for each correction plane. The amplifier 34 and calibrating potentiometer 40 likewise are of similar purpose in the devices of Figs. 1, 2, and as previously explained for the device of Fig. 1, there must be as many calibrating potentiometers 40 as there are correction planes.

During operation of the device of Fig. 2, because of the previously mentioned predetermined relative angular positions of the correction points, the measuring generator 22 may remain in a fixed angular position such that the coil 22b generates current exactly in phase with the current generated in the pick up coils C1, C2 by unbalance referred for correction to the axial plane of the points 1—4. If the device was always to be used for the same angular spacing of the axial planes of points 1—4 and of points 2—3 the other generator coil 22c could also be fixed at such predetermined angular spacing as to furnish current exactly in phase with the current generated in the pick up coils by unbalance in the axial plane of the points 2—3, but in order to adapt the machine for measurements where the angular spacing of the axial planes 1—4 and 2—3 is different than shown in Fig. 3 the coil 22c is spaced at 90° to the coil 22b, and current in exact phase for measurement of the unbalance in axial plane 2—3 is obtained by adjustment of potentiometers such as 42, 43. Measuring current of the one or the other phase is alternatively applied to the stationary coil 24a of the wattmeter by adjustment of a switch 44 similarly to the machine of Fig. 1. In the machine of Fig. 2 there are also switches 45, 46 controlling the connection of potentiometers such as 47, 48, 49, 50, the purpose of which is similar to that of the potentiometers 342, 343 of Fig. 1, as will be more fully explained.

After the device of Fig. 2 has been adjusted and calibrated in a manner similar to that explained for the device of Fig. 1, separate measurements of the unbalance components to be corrected at the different points 1, 2, 3, 4 may proceed as follows:

For measurement of unbalanced at point 1, Fig. 2, measuring generator 22 remains in its fixed position, the switches 32, 33 are each set in the position L indicated in the diagram, the switch 44 is set in the 1—4 position, and the switches 45, 46 are each set in the position indicated as 1. For present purposes potentiometers 47, 48, 49, 50 are adjusted to their ineffective position, indicated as Z. In such setting of the machine the movable coil 24b of the wattmeter is supplied with the current generated in coil C1 by both the unbalances 1—2, but since the stationary coil 24a of the wattmeter is supplied only with current in phase with that generated by unbalance in the plane 1—4 the wattmeter reading will indicate only that component of the total unbalance 1—2 which is referred to the correction point 1. For wattmeter readings indicating the correction necessary at point 4 the switch adjustments are the same except that the switches 32, 33 are each set in the position indicated at R, whereby the movable wattmeter coil is supplied from pick up coil C2, and the switches 45, 46 are each set in the position marked 4. In such setting the movable coil of the wattmeter is supplied with the total current generated in coil C2 by both unbalances 3, 4, but since the stationary wattmeter coil is still supplied with current in phase only with that generated by unbalance in the plane 1—4 the wattmeter will indicate only the unbalance component which is referred to the point 4. Separate wattmeter readings for measurement of unbalance corrections necessary at points 2, 3 may be similarly obtained by proper manipulation of the switches.

For the measuring operations as just described the measuring potentiometers 47, 48, 49, 50 were set in the position indicated at Z and in that position are of no effect. But if, during the measurement of the unbalance 1, and while the wattmeter 24 is indicating the amount of the unbalance, the corresponding potentiometer 47 is adjusted out of its Z position, a position of its adjustment will be found in which the current delivered to the wattmeter by the coil C1 is exactly overcome by an opposite current from the measuring generator 22, the required position being indicated by reduction of the wattmeter reading to zero. The amount of unbalance is then indicated by the amount of adjustment of the potentiometer necessary to effect the zero wattmeter reading. Similarly, for each of the unbalances 2, 3, 4, the corresponding potentiometers 48, 49, 50 may be adjusted for the potentiometer adjustment to separately indicate the unbalances. The potentiometers 47, 48, 49, 50 may each remain in adjusted position until the conclusion of the complete measuring operation, whereby to provide both a visual record of each separate necessary correction and an adjusted position of separate potentiometer members which may be used to control a subsequent operation of correcting the unbalance at the various correction points, as will be explained.

It will be noted that in the devices of Figs. 1, 2, some of the switches which have been separately shown for purposes of explanation may, in practice, be combined into multiple switches for simplicity of operation. These, and various other modifications which may be made for the purpose of convenience of operation will be apparent to those skilled in the art and therefore will not here be explained in detail.

Figure 4:
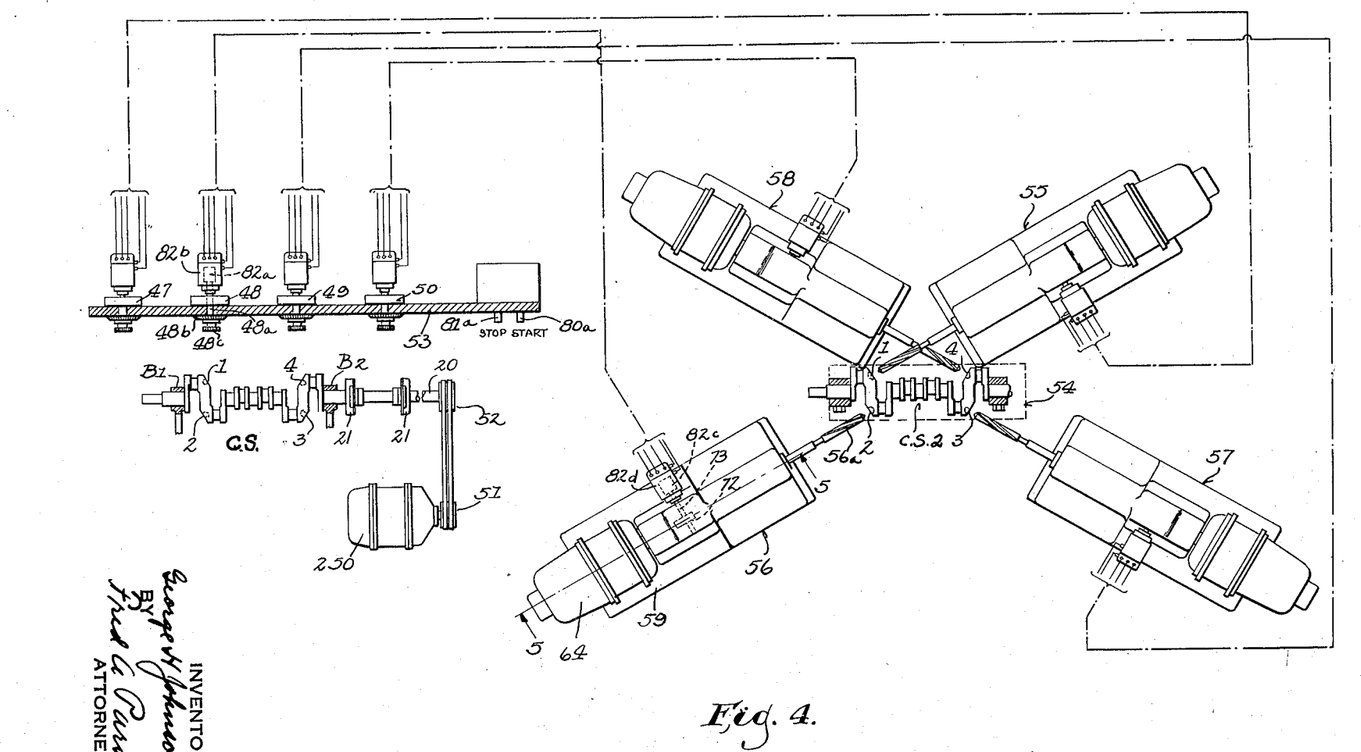
Figure 4 is a semi-diagrammatic plan view of a complete machine incorporating the invention where the device of Fig. 2 is used for controlling other portions of the machine.

The machine of Fig. 4 includes an unbalance measuring unit which is essentially the same as that shown in Fig. 2 and therefore is only partly shown in Fig. 4. The crank shaft C. S. of Fig. 4 is supported in oscillating bearings B1, B2 and driven from a motor 250 through pulleys 51, 52, shaft 20 and coupling elements 21, 21. The potentiometers 47, 48, 49, 50 are carried by a panel 53 and arranged for rotatable shafts, such as 48a, to operate the movable potentiometer elements, the shafts projecting through the panel and carrying adjusting dials such as 48b and manually operable adjusting knobs such as 48c.

The machine of Fig. 4 also includes a holding and locating fixture, generally denoted by the numeral 54, associated with driller units 55, 56, 57, 58, the driller units being positioned for the different drills, such as 56a, to operate for removal of unbalance correction material at the different correction points 1, 2, 3, 4. The fixture 54 provides suitable locating and clamping means for fixing the work piece C. S. 2 rigidly in proper position to present the correction points to the drills, but since such fixtures may be of any suitable well known form the locating and clamping means are not shown in detail. Following the adjustment of each of the measuring potentiometers 47, 48, 49, 50, to obtain a potentiometer setting corresponding to the unbalance correction required at each of the correction points, the work piece C. S. is transferred to the position indicated as C. S. 2 in the fixture 54, and during the measurement of unbalance in another work piece the various drill heads proceed with the removal of correction material at each correction point in an amount automatically determined by the previous setting of the corresponding measuring potentiometer, as will later be explained.

Figures 5, 6, 7:
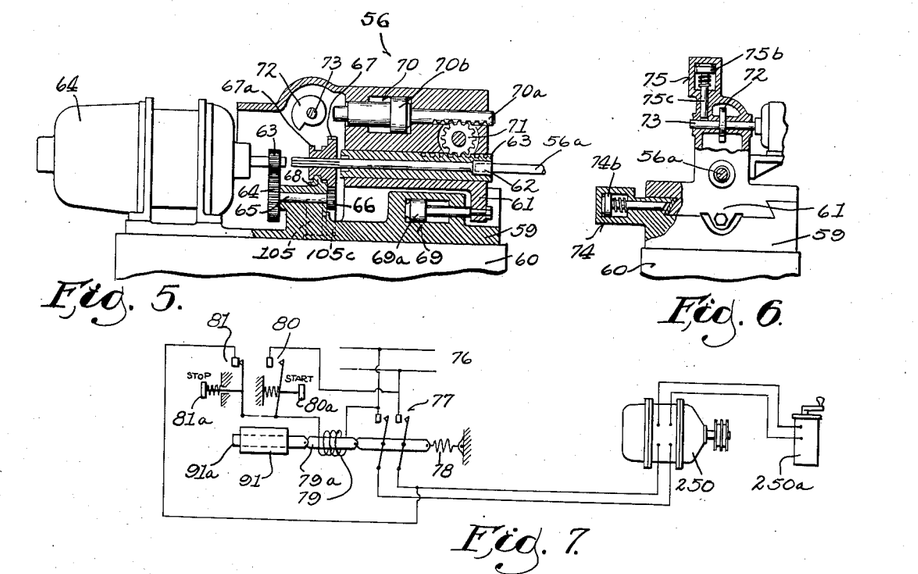
Figure 5 is a partial vertical section through a unit of the machine of Fig. 4, taken along line 5—5 of Fig. 4, and enlarged.
Figure 6 is a right hand elevation of the unit of Fig. 5, partly in section.
Figures 7, 8, 9 are diagrams showing some of the operating and control mechanism for the machine of Fig. 4, particularly as to certain motor control switches and their operating mechanism.

Each of the driller units 55, 56, 57, 58 is of the same construction, which will therefore be described in detail only for the unit 56, as shown in Figs. 4, 5, 6. Driller unit 56 includes a base portion 59 rigidly fixed on a base 60 which carries all the driller units and the fixture 54. A sliding frame 61 is guided in suitable slideways on base 59 for reciprocatory movement parallel with the axis of the drill 56a. A drill spindle 62 is rotatably fixed against axial movement relative to a non-rotatable sleeve 63 which is also guided in suitable slideways for reciprocatory movement parallel with the axis of drill 56a and spindle 62. A motor 64, fixed on base 59, drives the drill spindle 62 through a speed reducing train including the gears 63, 64, shaft 65 and gears 66, 67, the gear 67 having a hub portion 67a which is slidably keyed with the extended end of the drill spindle and prevented from axial movement by the engagement of a suitable annular groove with a fork portion 68 fixed on the base 59. The frame 61 is directly connected for reciprocatory movement from a piston device, generally denoted by the numeral 69, associated with base 59. The spindle sleeve 63 is connected for reciprocatory movement from a piston device generally denoted by the numeral 70, the piston rod 70a and the sleeve 63 each having suitable rack teeth, Fig. 5, engaging an idler gear 71. The depth to which drill 56a enters the work piece is determined by the angular adjustment of a depth cam 72 fixed on a shaft 73, as will later be more fully explained, the cam being positioned for abutment by the adjacent end of the piston rod 70a. The slide 61 may be locked in position relative to base 59 by a clamp piston device generally denoted by the numeral 74, Fig. 6, and the depth cam 72 may be locked in angular position by a clamp piston device generally denoted by the numeral 75. The depth cams 72 are configurated to provide for certain variable factors entering into the operation of the means for measurement of the unbalance etc. Some of such variable factors prevent a straight line relationship between measuring and correction effects but the cam provides a change in relative ratio of movement to permit correction in the exact amount measured for the unbalance throughout the range of the machine.

The work rotating motor 250 receives current from a line 76, Fig. 7, through a switch 77 which is urged to open position by a spring 78, but may be closed by a solenoid 79. For starting the motor 250 the solenoid circuit is completed through a normally open switch 80, operated by a push button 80a. After the motor is started switch 80 may be released, the solenoid circuit then being completed through switch 77 and through a normally closed switch 81, which may be operated by a push button 81a to open the solenoid circuit to again stop the motor. The speed of motor 250 may be regulated by a suitable controller, such as 250a, Fig. 7.

The various depth control cams such as 72, Figs. 4, 5, of the different driller units may be power rotated to an angular position corresponding to the position of the measuring potentiometer shafts such as 48a. There is corresponding mechanism for the depth cam of each driller unit and it will therefore be described only for the unit 56. The depth cam rotation is by the means of a position copying device, generally indicated by the numeral 82, Fig. 8, which includes a member 82a, Fig. 4, fixed for rotation with the potentiometer shaft 48a, a non-rotatable member 82b associated therewith, a member 82c fixed for rotation with the shaft 73 of the depth cam 72, and a stationary member 82d associated therewith. The construction in this instance is of well known electrical type in which the members 82a, 82c are the rotors of suitably wound induction motors, and the members 82b, 82d are the stators thereof, and which, when connected to a suitable power line, set up a torque to move the rotors to corresponding positions relative to the stators. The several position copying devices for the different driller units may be simultaneously connected to a power line 83, Fig. 8, through a switch 84 which is urged to open position by a spring 85 but may be closed by the means of a piston device generally indicated by the numeral 86, as will be later explained.

The several driller unit motors, such as 64, Figs. 4, 9, receive current from a line 87 through a switch 88 which is urged to open position by a spring 89 but may be closed by a piston device 90, as will be later explained.

Figure 10:
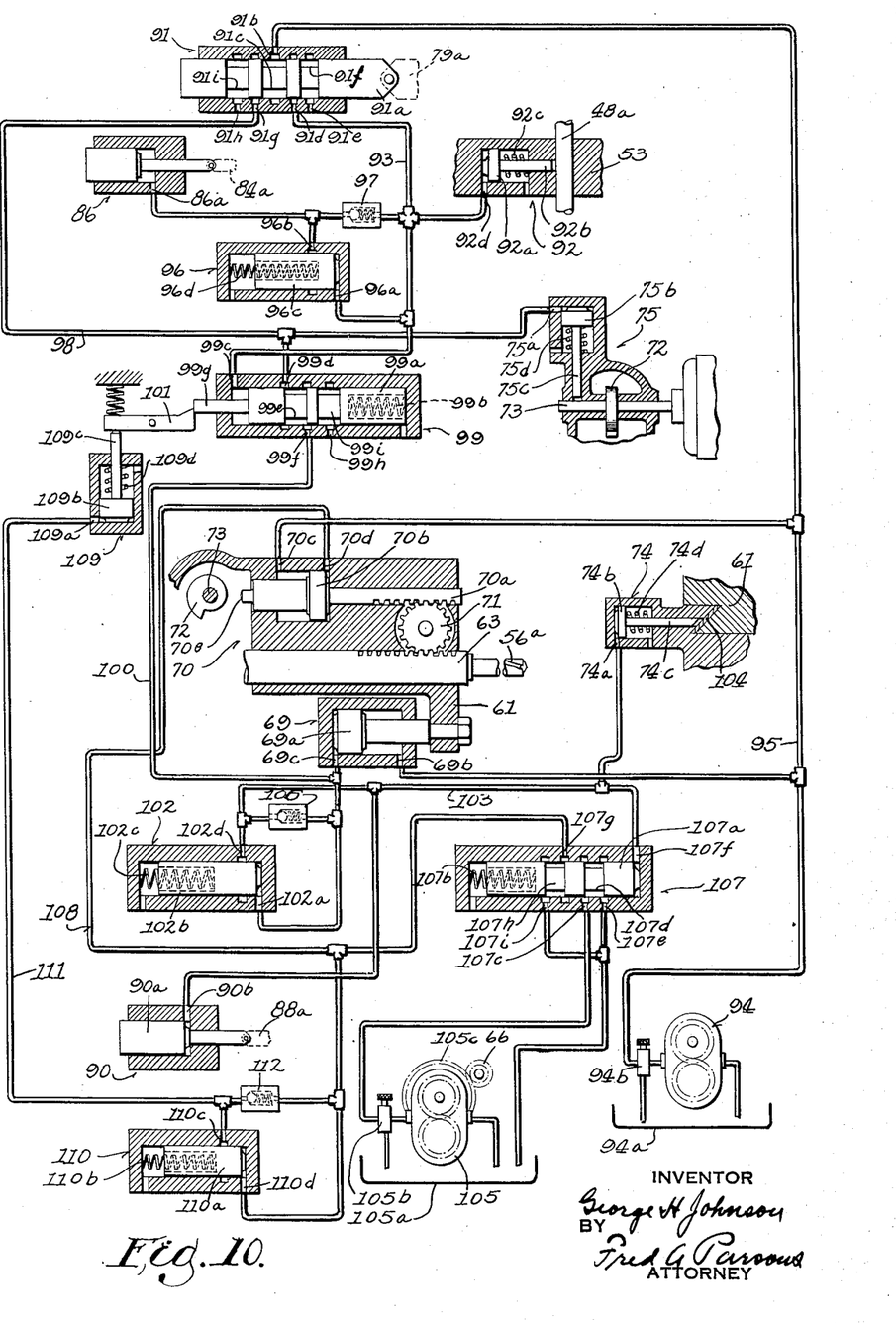
Figure 10 is a diagram showing the operating relationship of control mechanism and associated mechanism for the unit of Figs. 5, 6 and the operating relationship of such mechanism to other control mechanism, including the switch mechanism of Figs. 7, 8, 9.

The several depth cam positioning devices 82 are controlled in accordance with the operation of the switch 77 of motor 250 for the positioning devices to be operative when switch 77 is open and inoperative when switch 77 is closed, as follows:

The operation of switch 77 of motor 250 simultaneously operates a control valve 91, Figs. 7, 10. The valve member 91a is connected for movement with the armature 79a of the solenoid 79 and when switch 77 is opened pressure fluid is supplied through valve 91 for clamping each of the potentiometer shafts 48a etc. in the position of adjustment obtained during the unbalance measuring operation. These clamp piston devices are the same for each potentiometer and therefore only the piston device 92, Fig. 10, for the shaft 48a is shown in the drawings. Piston device 92 includes a piston 92a operable through a rod 92b for rigidly clamping shaft 48a against rotation but normally forced to inoperative position by a spring 92c. When valve member 91a of valve 91 is shifted to the right in Figs. 7, 10, during the opening of switch 77, clamping fluid is applied to the piston 92a from a supply port 91b through an annular groove 91c, a port 91d, a connecting line 93 and a port 92d of the piston device 92. In the other position of valve 91, when switch 77 is closed, the pressure fluid is cut off from line 93 and the clamp is released by spring 92c, line 93 and the port 92d then being connected to a vent 91e through the port 91d and an annular groove 91f.

The port 91b of valve 91 is supplied with pressure fluid from any suitable pressure source, such as a constantly driven pump 94, Fig. 10, drawing fluid from a reservoir 94a and connected to port 91b through an adjustable pressure relief valve 94b and a pressure line 95.

Figure 8:
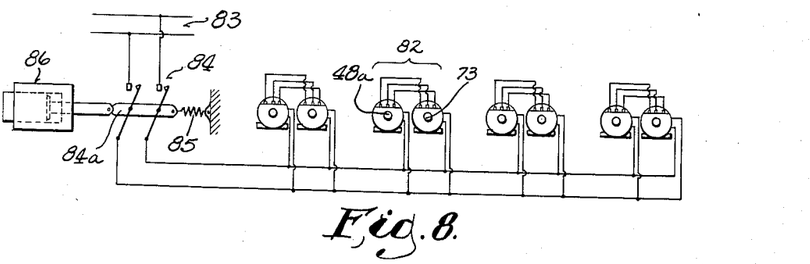

Piston device 86, Figs. 8, 10, of the switch 84 which operates the position copying devices 82, is controlled for switch 84 to be closed when switch 77 is opened, and to be opened when switch 77 is closed, the control being through the valve 91 and a pressure valve 96. Valve 96 includes a supply port 96a connected to the line 93 and port 91d, and an outlet port 96b connected to the port 86a of piston device 86. A plunger 96c is urged by a spring 96d to a position preventing fluid passage to port 86a, but as the pressure rises in line 93, following the opening of switch 77 and the operation of clamp piston devices 92, the plunger 96c moves against spring 96d and at a predetermined pressure level fluid passes to port 86a to close switch 84, but only after the clamp piston devices 92 have been operated to clamping position. When switch 77 is closed the port 91d is connected to the drain 91e, as previously stated, and spring 85, Fig. 8, then immediately opens the switch 84, the fluid from piston device 86 flowing out through a one-way valve device 97, which may be of any suitable well known form.

Following the closing of switch 77 and opening of switch 84, as previously described, the driller units 55, 56 etc., Fig. 4, are each operated through a cycle for removal of unbalance correction material on the work piece in fixture 54. Since the control means for effecting this cycle is the same for each driller unit it will be described only for the unit 56, as follows:

The closing of switch 77 shifts the valve 91 to the left in Figs. 7, 10, whereby to supply pressure fluid from port 91b to a line 98 through the annular groove 91c and a port 91g. Line 98 is connected for operation of the clamping piston device 75 for the depth cam 72, the connection being through a port 75a to supply fluid to a piston 75b, whereby piston rod 75c is forced into clamping engagement against the cam shaft 73 against the resistance of a spring 75d. In the open position of switch 77 the line 98 is connected to a drain port 91h through the port 91g and an annular groove 91i.

The closing of switch 77 also starts the operation of the piston device 69, Figs. 5, 10 for forward movement of the slide 61. Piston 69a and slide 61 is continuously urged in the other direction by pressure fluid received from the line 95 through a port 69b, but when switch 77 is closed the pressure fluid in line 98 is connected for the forward movement of the slide through a valve device 99, Fig. 10, a connecting line 100 and a port 69c. The valve device 99 includes a plunger 99a which is urged to the left in Fig. 10 by a spring 99b but which, during the open position of switch 77 has been forced to the right, to the position shown in the drawings, Fig. 10, by fluid pressure from line 93 operating through a port 99c. When the pressure is relieved in line 93 in the closed position of switch 77 the plunger 99a is retained in its right hand position against the pressure of spring 99b, except as later explained, by a pivoted spring operated dog or latch 101, and pressure fluid will then pass from line 98 to line 100 through a pressure port 99d, an annular groove 99e and an outlet port 99f, whereby to effect the forward movement of the piston and slide 61.

The forward movement of slide 61 takes place while the drill 56a is non-rotating. The drill is continuously urged to its retracted position relative to slide 61 by fluid pressure from line 95 acting on the piston 70b of piston device 70 through a port 70c. The forward movement of slide 61 continues until the non-rotating drill strikes the work piece. At this point the slide cannot travel farther forward and the pressure rises in the supply line 100, which is connected to operate a pressure valve 102 through a port 102a. Following the increase of pressure to a predetermined level the plunger 102b will move against the resistance of a spring 102c whereby fluid passes from port 102a to a port 102d and through a supply line 103 to the port 74a of the slide clamping piston device 74, Figs. 6, 10, whereby the piston 74b operates to clamp the slide 61 through a piston rod 74c and a gib 104, but only after the non-rotating drill has contacted the work piece. When pressure is relieved in line 100, as later described, the slide 61 is immediately unclamped by a spring 74d, the pressure in line 103 being relieved by return of fluid to line 100 through a one-way valve device 106 of any suitable form.

Figure 9:
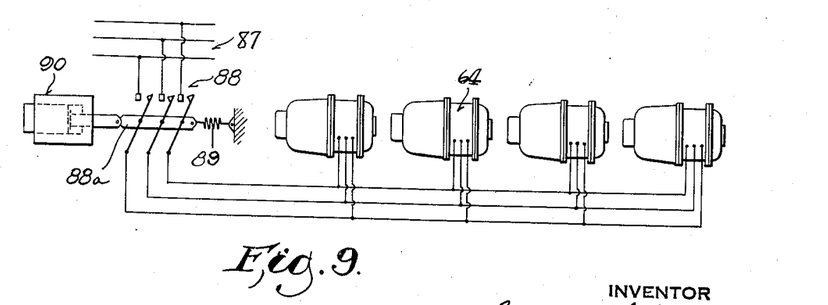

Simultaneously with the clamping of slide 61 as just described the switch 88 is closed by the piston device 90, Figs. 9, 10, to start the drill motors, such as 64. For this result the pressure fluid from line 103 is connected to the piston 90a through a port 90b whereby to close the switch against the resistance of spring 89. When fluid pressure is relieved in line 103 the spring 89, Fig. 9, immediately opens the switch.

Following the starting of the drill motor, as just described, the piston device 70 is operated for feeding forward the drill spindle and drill 56a, as follows: For each driller unit there is a feed fluid supply source such as a pump 105, Figs. 5, 10. Pump 105 may be of any suitable type, preferably adjustable for a change of feed rate and preferably of relatively small volume of delivery as compared with pump 106, whereby the feed rate is relatively slow as compared with the other forward movement and the reverse movements of the drills such as 56a. The pump 105 is driven from the drill motor, such as 64, by gearing such as a gear 105c engaging the gear 66, whereby the pump is operative only when the drill is rotating. Pump 105 draws fluid from a reservoir 105a and delivers fluid to a port 70d of the piston device 70 through an adjustable relief valve 105b, a valve device 107 and a line 108. The valve 107 includes a plunger 107a urged by a spring 107b toward a position in which the fluid supplied from the pump 105 through a supply port 107c is returned to reservoir 105a through an annular groove 107d and a drain port 107e, but following the clamping operation of piston device 74 and the closing of switch 88 by piston device 90, as previously described, the pressure rises in line 103 and operates through a port 107f to shift the plunger 107a to a position in which port 107c communicates with line 108 through the annular groove 107d and a port 107g, whereby to start the feed motion of piston 70b and drill 56. When the pressure is relieved in line 103, as later described, the spring 107b again forces plunger 107a to the position connecting port 107c to the reservoir 105a, as previously described, and also connecting port 70d of piston device 70 to the reservoir through an annular groove 107h and a drain port 107i, whereby the constant pressure in port 70c again forces the drill 56a to retracted position.

During the forward feed of the drill, as just described, the piston end 70e of piston device 70 will eventually contact the depth cam 72 to prevent further feed of the drill. At this point in the drill movement the pressure rises in line 108, and operates a piston device 109, Fig. 10, through a pressure valve 110, whereby to trip the latch dog 101 to effect return of the driller unit to starting position, as follows:

Pressure valve 110 includes a plunger 110a urged by a spring 110b to a position closing an outlet port 110c. Line 108 is connected to valve 110 through a port 110d and at a predetermined pressure in line 108 the plunger moves to effect communication between ports 110d and 110c, and fluid passes from line 108 to a port 109a of piston device 109 through a line 111, whereby piston 109b and piston rod 109c are moved against the resistance of a spring 109d to swing latch 101 out of the path of movement of the projecting end 99g of the plunger 99a. The plunger 99a is then forced by the spring 99b to a position in which line 100 communicates with a drain port 99h through an annular groove, 99i.

Following the tripping of latch 101 and resulting connection of line 100 to the drain port 99h, as just described, the pressure is simultaneously relieved on line 103, as previously described. This permits spring 74d to unclamp piston device 74 and slide 60 and permits the constant pressure acting through port 69b to operate piston device 69 to return the slide 61 to retracted position. It also permits spring 89 to open switch 88 to stop motor 64, whereby drill 56a ceases to rotate and pump 105 no longer supplies feeding fluid. Also, the reduced pressure in line 103 permits spring 107b to operate valve 107 to connect line 108 to drain port 107i and the constant pressure acting on piston device 70a through port 70c retracts the drill 56a and shifts the end 70e of plunger 70 out of the path of depth cam 72 whereby the plunger will not interfere with rotation of the cam by the positioning device 82, as previously described, at the next subsequent opening of switch 77. The clamping piston device 75 is, however, maintained in clamping position preventing rotation of the depth cam 72 until valve 91 is shifted to connect line 98 to the drain port 91h at the next subsequent opening of switch 77. When line 108 is connected to its drain port 107i, the fluid pressure is immediately relieved on piston 109b, the line 111 returning the fluid to line 108 through a one-way valve device 112, of any suitable form. The piston 109b is then forced by spring 109d to a position permitting latch 101 to again operate to retain the plunger 99a of valve 99, but not until switch 77 is again opened, whereby valve 91 shifts to supply pressure to line 93 and port 99c, as previously described.

From the foregoing description it will be seen that the machine of Fig. 4 may be operated to automatically complete the correction of unbalance in a work piece just measured and without attention from the operator while the measuring of unbalance proceeds on the next work piece. Thus the operator, having completed the adjustment of potentiometers 47, 48, 49, 50, Figs. 3, 4, during the measurement of a work piece, operates push button 81a, Figs. 4, 7, to stop rotation, unloads the work piece from the bearings B1, B2, Figs. 3, 4, and clamps it in the fixture 54, Fig. 4. A new work piece is then loaded in the bearings B1, B2. During this unloading and loading operation the positioning devices such as 82, Fig. 8, have operated to adjust the depth control cams of the drill units to determine the subsequent unbalance correction of the first work piece in accordance with the previous potentiometer settings. The push button 80a is then operated to start rotation of the new work piece, and during subsequent adjustment of the potentiometers for the new work piece the drill units automatically proceed through their cycle of operation for correction of unbalance in the first work piece and are automatically returned to starting position ready for the cycle to be repeated.

The machine of Fig. 4, in the form previously described, is applicable only where the measurement and correction of unbalance in successive work pieces does not involve a change in the angular positions of the correction points. The machine may however be modified to similarly automatically complete the correction of unbalance even where the angular position of the correction points is different in each successive work piece, as would be the case where the measurement of unbalance was done with the device of Fig. 1. A modification suitable for use with the measuring unit of Fig. 1 is shown in Fig. 11.

In the device of Fig. 1, as previously explained, there are only two correction points, respectively located in the correction planes P1, P2, and it is obvious that where the unbalance measuring portion of the machine of Fig. 4 is of the type shown in Fig. 1 it will be necessary to use only two of the driller units such as 56, Fig. 4. The control of the cycle of advance and retreat of the drills, and the control of the depth of drilling etc. may be identical with the controls previously described for the same purpose in the machine of Fig. 4. Such mechanism is, therefore not shown in Fig. 11.

Figure 11:
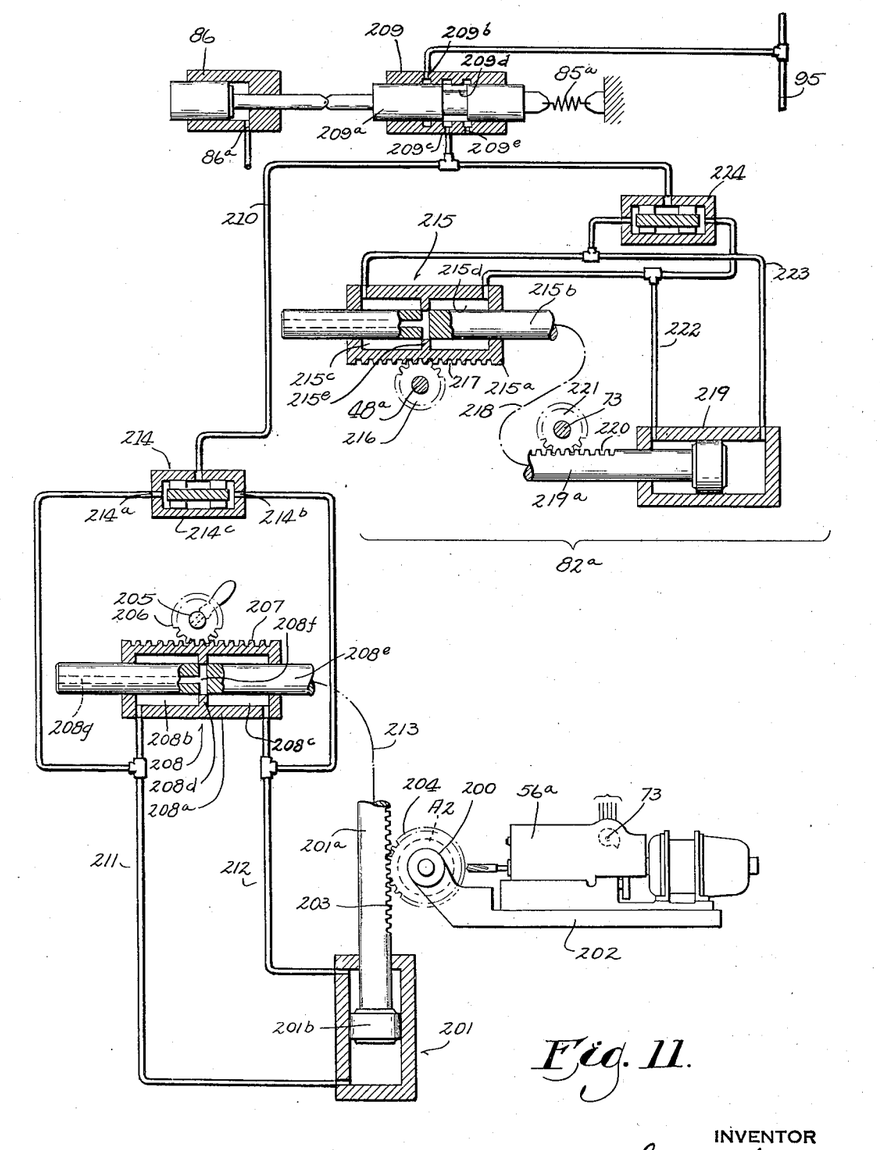
Figure 11 shows portions of a modified machine.

In the modified form of machine, using the measuring unit of Fig. 1, each of the two driller units must be angularly adjustable relative to the work holding fixture in accordance with the angular position of the unbalance, as determined by the angular adjustment of the measuring generator 22, as previously described in connection with Fig. 1. Since the control mechanism for angular adjustment of each of the driller units may be similar in construction it is shown only for one driller unit 56a in Fig. 11, and operates as follows:

At the conclusion of the unbalance measuring operation the work piece is transferred from the unbalance measuring device to a position indicated at A2, Fig. 11, to be held in a work holding fixture, which may be of construction similar to the fixture 54, Fig. 4, and therefore is not shown in Fig. 11. Each of the driller units such as 56a, Fig. 11 is supported on suitable trunnions such as 200 for angular rotation about the axis of the work piece A2, and may be rotated by the means of a piston device such as 201 connected to the support 202 of the driller unit through a rack 203 on the piston rod and a gear 204 fixed on the support.

For the unbalance measuring operation there should preferably be, for the modified machine, two measuring generators such as 22, Fig. 1, each with its magnet 22a fixed to the shaft 20 in the manner previously described, and with suitable switch connections, not shown, whereby the generators may be separately used, respectively for measurement of the amount and angle of unbalance correction required in the different correction planes P1, P2, Fig. 1, and respectively for the control of the angular adjustment of the different driller units such as 56a, Fig. 11. Each of the generators is connected for angular adjustment from a rotatable shaft such as 205, Fig. 11, there being any suitable connecting mechanism, not shown, the shaft 205 being connected through a gear 206, and rack 207 for shifting the outer member 208a of a control valve 208. At the conclusion of the unbalance measuring operation the valve member 208a is therefore in a position corresponding to the angular position of the unbalance to be corrected.

When the motor control switch, such as switch 77, Fig. 7, of the modified machine, is opened to stop rotation of the work piece at the conclusion of the measuring operation, it results, as previously described, in the shifting of a valve such as 91, Figs. 7, 10 whereby to shift the piston of a piston device 86, Figs. 8, 11 to the left. In the modified machine of Fig. 11 the piston of device 86 is suitably connected to the shiftable member 209a of a valve 209, whereby the shifting of the piston of device 86 to the left supplies pressure fluid from the pressure line 95, Figs. 10, 11, to a line 210 through the ports 209b, 209c and an annular groove 209d. It will be understood that valve 209 may be used in addition to mechanism for operation of switch 84, Fig. 8, but it may also be used as a substitute for the switch mechanism, as later explained. When line 210 is so supplied, that is to say when the control switch such as 77 is opened, the pressure fluid will operate the piston 201 whereby to angularly adjust driller unit 56a to a position corresponding to the adjustment of valve member 208a effected during the measuring operation, the operation being as follows:

The valve member 208a, Fig. 11, has two annular chambers, 208b, 208c, respectively connected by the channels 211, 212, Fig. 11, to opposite ends of the piston device 201. Chambers 208b, 208c are separated by an annular partition 208d. The valve 208 has an inner member 208e which is connected for movement with the piston rod 201a of piston device 201 by any suitable connection as indicated at 213. Extending transversely through the valve member 208e is a leakage port 208f from which leakage may pass to the sump through a channel 208g, and which is of a width to be exactly covered by the partition 208d when the parts are suitably positioned. If the piston rod 201a and valve member 208e are in a position corresponding to the position of adjustment of the valve member 208a no leakage will take place through leakage port 208f and channel 208g, but if the position of piston rod 201a, and of the driller unit 56a, does not correspond to the position of adjustment of valve member 208a which was effected during the preceding measuring operation then the leakage port will communicate with one of the annular channels 208b, 208c and pressure will be relieved at the one side of piston 201b. At the same time pressure fluid will be supplied to the other side of piston 201b from the pressure line 210 which is connected to each of the lines 211, 212 through a floating valve 214, Fig. 11, respectively through the ports 214a, 214b. Whenever leakage takes place from either annular chamber 208b, 208c the valve member 214c moves to cover the port which connects to the leak, while maintaining a pressure connection through the other port operative to move the piston 201b and valve member 208e to a position corresponding to valve member 208a, whereby to close the leak.

By the means of the mechanism described each of the driller units such as 56a of the modified machine of Fig. 11 will be angularly moved to a position corresponding to the angular position of the complementary measuring generator as soon as the switch 77 is opened to stop the rotation of the work piece in the measuring unit at the conclusion of the measuring operation.

In the modified machine of Fig. 11 when the work piece just measured has been placed in the drilling fixture and a new work piece placed in the measuring unit, the switch such as switch 77, Fig. 4, is closed to start rotation of the new work piece for the measuring operation, as described for the machine of Fig. 4. Upon the closing of switch 77 pressure on piston device 86, Figs. 10, 11 is relieved, as has been previously described, and valve member 209a is shifted to the right, Fig. 11, by a spring 85a, thereby cutting off the pressure fluid from line 210 and connecting the line to a sump through the annular groove 209d and a drain port 209e. In this adjustment the measuring generators of the modified machine may be freely angularly adjusted during the subsequent measuring operation to adjust the valve members 208a without affecting the position of piston device 201 or the angular adjustment of the driller heads 26a, but it is preferable that suitable clamp means, not shown in Fig. 11, controlled similarly to the clamp piston device 75 of Fig. 4 for fixing the angular position of the depth cam shafts 73, should be employed in the modified machine to fix the position of angular adjustment of the driller units 56a, during the time when the control switch 77 remains closed.

As stated, in all matters except those just described, the modified machine of Fig. 11 may be controlled similarly to the described control for the machine of Fig. 4. But for either machine it may be preferable that hydraulic copying devices, instead of the electrical copying devices such as 82, Fig. 8, should be used to adjust the depth cam shafts such as 73, Figs. 4, 5, 8, in accordance with the position of the potentiometer shafts such as 48a, Figs. 4, 8. In addition to the modifications previously explained Fig. 11 also shows a hydraulic copying device for connecting the potentiometer shafts such as 48a with the depth cam shafts such as 73, as follows:

The potentiometer shafts such as 48a, Figs. 4, 11 are connected for movement of the outer member 215a, Fig. 11 of a valve 215 through a gear 216 and a rack 217. The inner member 215b of valve 215 is connected by the means of a suitable connection indicated at 218 for movement with the piston rod 219a of a piston device 219, the piston rod being also connected with the cam shaft 73 through a rack 220 and a gear 221. Annular chambers 215c, 215d of valve 215 are separated by a partition 215e which cooperates with a leak port 215f, the annular chambers being respectively connected with the opposite ends of piston device 217 through channels 222, 223, which are supplied with pressure fluid through the valve 209 whenever the piston device 86 is shifted to the left upon the opening of switch 77, as previously described, the fluid supply being through a floating valve 224 which is similar in construction and operation to the floating valve 214.

The operation of the valve 215 of copying device 82a, Fig. 11, for controlling the angular position of cam shafts 73 in accordance with potentiometer shafts 48a will be understood from the previous description of the operation of valve 208 in controlling the angular position of the driller units 56a, and therefore need not be described in detail, except to point out that the connection for operation from piston device 86 is such that the hydraulic copying devices 82a, Fig. 11 operate in proper timing to maintain the operating cycle of the machine similarly to the electrical copying devices 82 of the machine of Fig. 4.

The machine of Fig. 4 and the machine as modified in Fig. 11 both contemplate the use of position copying devices for automatically effecting adjustments of the unbalance correcting portions in accordance with the adjustment of the unbalance measuring portions. It is to be understood however that the invention in some of its forms may not include such position copying devices, or may include only some of those here shown. Thus the position copying devices 82 or 82a for positioning the depth cams 72 may be eliminated and as a substitute therefor there may be used suitable dials, not shown, on the shafts 73, which are manually adjusted to the same position as the corresponding potentiometer dials 48b, etc. Similarly for the position copying devices for angularly positioning the driller units such as 56a in the modified machine of Fig. 11, but in this instance it may be preferable to retain the position copying device for power adjustment of the driller and merely to apply a separately manually adjustable dial to the shaft 205, which may be adjusted to correspond to the angular adjustment of the measuring generator. Where such separately manually adjustable dials are used they may, for convenience, be positioned adjacent to the unbalance measuring device of the machine.

These and various other modifications may be made in the machines here shown, but since such modifications will be readily perceived and understood by those skilled in the art they will not be here described in detail.

It will be noted that the machine of Fig. 4, and each of the modified forms herein referred to includes an unbalance measuring portion and an unbalance correcting portion, both of which are brought under unitary control by the interconnection of certain of the transmission and control means in a manner particularly adapted to simplify the manual operations previously required for correcting unbalance and to prevent errors on the part of the operator. In the machines of Figs. 4 and 11, for example, except for the manual loading and unloading of the work piece, the operator's duties in order to put into effect the measured unbalance corrections determined by adjustment of the measuring dials such as 48b, Fig. 4, require merely the operation of the start and stop buttons 80a, 81a, Fig. 7, and the correction of unbalance proceeds to its conclusion automatically with no possibility of errors or confusion such as might arise if the measurements of unbalance were required to be transferred to an independent correction machine, or if the cycles of power movement of the measuring and correcting portions proceeded independently.

What is claimed is:

1. In a machine for reducing unbalance about the intended axis of each of a plurality of work pieces, the combination of a device for individually determining some of the characteristics of unbalance about the said axis in each of said work pieces, a device for individually altering the unbalance about said axis in each of said work pieces, and an operative interconnection between said determining device and said altering device for effecting some of the characteristics of the alteration in each of said work pieces in automatic accordance with the characteristic of unbalance determined for the same work piece by said determining device.

2. In a machine for reducing unbalance about the intended axis of each of a plurality of work pieces, the combination of a device for individually determining some of the characteristics of unbalance about said axis in each of said work pieces, a device for individually altering the unbalance about said axis in each of said work pieces, an operative interconnection between said determining device and said altering device for effecting some of the characteristics of the alteration in each of said work pieces in automatic accordance with the characteristic of unbalance determined for the same work piece by said determining device, and an operative interconnection between said determining device and said altering device for automatically preventing operation of said altering device on an individual work piece except during an interval predetermined relative to the start of the operation of the determining device on a work piece which is to be subsequently altered.

3. In a machine for reducing unbalance about the intended axis of each of a plurality of work pieces, the combination of an unbalance determining device including a member adjustable for individually determining some of the characteristics of unbalance about said axis in each of said work pieces, an unbalance alteration device including an element adjustable for individually establishing a characteristic of an unbalance alteration about said axis in each of said work pieces, and an operative interconnection between said devices for adjustment of said element for each of said work pieces in automatic accordance with the adjustment of said member for the same work piece.

4. In a machine for reducing unbalance about the intended axis of each of a plurality of work pieces, the combination of an unbalance determining device including a member adjustable for individually determining some of the characteristics of unbalance about said axis in each of said work pieces, an unbalance alteration device including an element adjustable for individually establishing a characteristic of an unbalance alteration about said axis in each of said work pieces, an operative interconnection between said devices for adjustment of said element for each work piece in automatic accordance with the adjustment of said member for the same work piece, and an operative interconnection between said devices preventing operation of the first mentioned interconnection except during an interval predetermined relative to the operation of one of said devices.

5. In a machine for reducing unbalance about the intended axis of each of a plurality of work pieces, the combination of a device for individually determining some of the characteristics of unbalance about said axis in each of said work pieces, a device for individually altering the unbalance about said axis in each of said work pieces in accordance with the characteristic of unbalance determined for the same work piece by said determining means, and an operative interconnection between said determining device and said altering device for automatically preventing operation of the altering means on an individual work piece except during an interval predetermined relative to the initiation of the operation of the determining device on a work piece which is to be subsequently altered.

6. In a machine for reducing unbalance about the intended rotation axis of each of a plurality of work pieces, the combination of a device for individually determining an unbalance moment about said axis for each of said work pieces, a device for individually altering the unbalance about said axis in each of said work pieces, and an operative interconnection between said devices under the control of said unbalance moment determining device for individually controlling the unbalance alteration effected by said altering device in each work piece in automatic accordance with the unbalance moment determined by said determining device for the same work piece.

7. In a machine for reducing unbalance about the intended axis of each of a plurality of work pieces, the combination of an unbalance determining device including a member adjustable for individually determining an unbalance moment about said axis for each of said work pieces, an unbalance alteration device including an element adjustable for individually establishing the amount of an unbalance alteration about said axis in each of said work pieces, and an operative interconnection between said devices for adjustment of said element for each of said work pieces in automatic accordance with the adjustment of said member for the same work piece.

8. In a machine for reducing unbalance about the intended axis of each of a plurality of work pieces, the combination of a device for individually altering the balance about said axis in each of said work pieces, a device for individually establishing the angle of an unbalance moment about said axis in each of said work pieces, and an operative interconnection between said angle establishing device and said altering device to effect the alteration of each work piece about said axis at an angle determined for the same work piece automatically by said angle establishing device.

9. In a machine for reducing unbalance about the intended axis of each of a plurality of work pieces, the combination of a device for individually establishing the angle of an unbalance moment about said axis in each of said work pieces, a device for individually altering the balance about said axis in each of said work pieces at an angle in accordance with the angle of unbalance moment established for the same work piece by said angle establishing device, and an operative interconnection between said angle establishing and said altering device for automatically preventing operation of the altering device on a work piece except during an interval having a predetermined timing relative to the starting of the operation of the angle establishing device on a work piece which is to be subsequently altered.

10. In a machine for reducing unbalance about the intended axis of each of a plurality of work pieces, the combination of an unbalance angle determining device including a member adjustable for individually determining the angle of an unbalance about said axis in each of said work pieces, a balance altering device including an element adjustable for individually establishing the angle of a balance alteration about said axis in each of said work pieces, and an operative interconnection between said member and element to individually establish for each work piece the angle of unbalance correction in automatic accordance with the angle of unbalance moment determined for the same work piece.

11. In a machine for reducing unbalance about the intended axis of each of a plurality of work pieces, the combination of an unbalance angle determining device including a member adjustable for individually determining the angle of an unbalance about said axis in each of said work pieces, a balance altering device including an element adjustable for individually establishing the angle of a balance alteration about said axis in each of said work pieces, an operative interconnection between said devices for adjustment of said element for each work piece in automatic accordance with the adjustment of said member for the same work piece, and an operative interconnection between said devices preventing operation of the first mentioned interconnection except during an interval predetermined relative to the operation of said angle determining device on a work piece which is to be subsequently altered.

12. In a machine for reducing unbalance about the intended axis of each of a plurality of work pieces, the combination of a first device including a transmission for rotation of said work pieces on said axis and a portion adjustable in accordance with some of the individual unbalance characteristics of each of said work pieces during rotation about said axis, a second device for individually altering the balance about said axis in each of said work pieces, and an operative interconnection between said portion and the last mentioned device for individual control for each of said work pieces of some of the characteristics of the alteration effected by said altering device in automatic accordance with the adjustment of said adjustable portion for the same work piece.

13. In a machine for reducing unbalance about the intended axis of each of a plurality of work pieces, the combination of a first device including a transmission for rotation of said work pieces on said axis and a portion adjustable in accordance with some of the individual unbalance characteristics of each work piece during rotation about said axis, a second device for individually altering the balance about said axis in each of said work pieces, an operative interconnection between said devices for individual control for each of said work pieces of some of the characteristics of the alteration effected by said altering device in automatic accordance with the adjustment of said adjustable portion for the same work piece, and an operative interconnection between said devices preventing operation of the first mentioned interconnection during adjustment of said adjustable portion.

14. In a machine for reducing unbalance about the intended axis of each of a plurality of work pieces and in each of a plurality of axially spaced planes in each work piece, the combination of a first device including a transmission for rotation of said work pieces on said axis and a plurality of members respectively adjustable in accordance with an unbalance characteristic in different of said planes during rotation of each work piece, a second device including a plurality of unbalance altering portions respectively for alteration of balance in different of said planes said devices being spaced apart for transfer of work pieces from the first to the second device, and operative interconnections between said devices for controlling the alteration effected by different of said altering portions respectively in automatic accordance with the adjustment of different of said members, whereby to effect for each of said planes in each work piece an alteration in automatic accordance with the determination of an unbalance characteristic by said first device for the same planes in the same work piece.

15. In a machine for reducing unbalance about the intended axis of each of a plurality of work pieces, the combination of a device operable for repeated cycles of operation respectively for individually determining some of the characteristics of unbalance about said axis in different of said work pieces, a device operable for repeated cycles of operation respectively for individually altering the unbalance about said axis in different of said work pieces, an operative interconnection between said devices for effecting some of the characteristics of the alteration in each work piece by said altering device in automatic accordance with the characteristic of unbalance determined for the same work piece by said determining device, and an operative interconnection between said devices for effecting an automatically timed relationship between said cycles of operation of the different devices.

16. In a machine for reducing unbalance about the intended axis of each of a plurality of work pieces, the combination of a device for individually determining some of the characteristics of unbalance about said axis in each of said work pieces while the work piece is rotating and including work rotating and unbalance determining mechanism operable for repeated cycles of operation respectively for different of the work pieces, a device for individually altering the unbalance about said axis in each of said work pieces including altering and actuating mechanism operable for repeated cycles of operation respectively for different of the work pieces, an operative interconnection between said devices for effecting some of the characteristics of the alteration in each work piece by said altering device in automatic accordance with the characteristic of unbalance determined for the same work piece by said determining device, and an operative interconnection between said devices for effecting an automatically timed relationship between said cycles of operation of the different devices.

17. In a machine for reducing unbalance about the intended axis of each of a plurality of work pieces, the combination of a device for individually determining some of the characteristics of unbalance about said axis in each of said work pieces, a device for individually altering the amount of unbalance about said axis in each of said work pieces including a work support and a relatively movable tool support and a transmission for a relative forward movement of said supports for effecting contact of a tool carried by said tool support with a work piece carried by said work support followed by a feeding movement, control mechanism for said transmission mechanism including trip means for automatically establishing the start of said feeding movement upon said contact of the tool and work irrespective of variations in the position of the contacted portion of the work piece relative to said work support, and including a stop adjustable for varying the extent of said feeding movement, and other control mechanism including a member associated with said determining device and adjustable in accordance with the determination of the different unbalance characteristics effected thereby for the different work pieces and a connection operable for adjustment of said stop in accordance with the adjustment of said member.

18. In a machine for reducing unbalance about the intended axis of each of a plurality of work pieces the combination of a device for individually determining some of the characteristics of unbalance about said axis in each of said work pieces, a device for individually altering the amount of unbalance about said axis in each of said work pieces including a work support, a relatively movable tool support and a transmission for a relative forward movement of said supports for effecting contact of a tool carried by said tool support with a work piece carried by said work support followed by a feeding movement, control mechanism for said transmission mechanism for automatically establishing the start of said feeding movement upon said contact of the tool and work irrespective of variations in the position of the contacted portion of the work piece relative to said work support, and an operative interconnection between said devices for individually establishing for each work piece the extent of said feeding movement in automatic accordance with the unbalance characteristic determined for the same work piece by said determining device.

19. In a machine for reducing unbalance about the intended axis of each of a plurality of work pieces, the combination of an unbalance determining device including a member adjustable for determining an unbalance moment about said axis individually for each of different of said work pieces, an unbalance alteration device including an element adjustable for establishing the amount of an unbalance alteration individually for each of different of said work pieces, an operative interconnection between said member and said element for establishing the amount of unbalance correction in a work piece by said correction device in automatic accordance with the unbalance moment determined for the same work piece by said determining device, and an operative interconnection between said determining device and the first mentioned interconnection preventing operation of said first mentioned interconnection during unbalance moment determining operation of said determining device.

20. In a machine for reducing unbalance about the intended axis of each of a plurality of work pieces, the combination of a device for individually determining some of the characteristics of unbalance about said axis in each of said work pieces while the work piece is rotating and including work rotating and unbalance determining mechanism operable for repeated cycles of operation respectively for different of the work pieces, a device for individually altering the unbalance about said axis in each of said work pieces including altering and actuating mechanism operable for repeated cycles of operation respectively for different of the work pieces, an operative interconnection between said devices for effecting some of the characteristics of the alteration in each work piece by said altering device in automatic accordance with the characteristic of unbalance determined for the same work piece by said determining device, and an interconnection operative between said devices for automatically establishing operation thereof to substantially simultaneously effect one of said cycles of operation of each device or alternatively operative to establish a period of simultaneous interruption of said cyclic operation in both said devices during which a transfer of a work piece may take place from the one to the other device.

21. In a machine for reducing unbalance about the intended axis of each of a plurality of work pieces, the combination of a device operable for repeated cycles of operation respectively for individually determining some of the characteristics of unbalance about said axis in different of said work pieces, a device operable for repeated cycles of operation respectively for individually altering the unbalance about said axis in different of said work pieces, an operative interconnection between said devices for effecting some of the characteristics of the alteration in each work piece by said altering device in automatic accordance with the characteristic of unbalance determined for the same work piece by said determining device, and an interconnection operative between said devices for automatically establishing operation thereof to substantially simultaneously effect one of said cycles of operation of each device or alternatively operative to establish a period of simultaneous interruption of said cyclic operation in both said devices during which a transfer of a work piece may take place from the one to the other device.

22. In a machine for reducing unbalance about the intended rotation axis of each of a plurality of work pieces, the combination of a device adjustable for individually determining an unbalance moment about said axis for each of said work pieces, a device for individually altering the unbalance about said axis in each of said work pieces, and an operative interconnection between said devices under the control of said unbalance moment determining device for individually controlling the unbalance alteration effected by said altering device in each work piece in automatic accordance with the unbalance moment determined by said determining device for the same work piece, said interconnection including means operative to change the ratio of the adjustment of said determining device relative to the alteration effected by said altering device in different positions of said adjustment.

23. In a machine for reducing unbalance about the intended axis of each of a plurality of work pieces, the combination of an unbalance determining device including a member adjustable for individually determining an unbalance moment about said axis for each of said work pieces, an unbalance alteration device including an element adjustable for individually establishing the amount of an unbalance alteration about said axis in each of said work pieces, and an operative interconnection between said devices for adjustment of said element for each of said work pieces in automatic accordance with the adjustment of said member for the same work piece, said interconnection including means operative to vary the ratio of the adjustment of said unbalance determining member relative to the amount of unbalance alteration effected by said alteration device in different positions of the member adjustment.

24. In a machine for reducing unbalance about the intended axis of each of a plurality of work pieces, the combination of a first device including a transmission for rotation of said work pieces on said axis and a portion adjustable in accordance with some of the individual unbalance characteristics of each of said work pieces during rotation about said axis, a second device for individually altering the balance about said axis in each of said work pieces, and an operative interconnection between said portion and the last mentioned device for individual control for each of said work pieces of some of the characteristics of the alteration effected by said altering device in automatic accordance with the adjustment of said adjustable portion for the same work piece, said interconnection including means operative to change the ratio of the adjustment of said adjustable portion relative to the alteration effected by said altering device in different positions of the adjustment of said portion.

25. In a machine for reducing unbalance about the intended axis of each of a plurality of work pieces and in each of a plurality of axially spaced planes in each work piece, the combination of a first device including a transmission for rotation of said work pieces on said axis and a plurality of members respectively adjustable in accordance with an unbalance characteristic in different of said planes during rotation of each work piece, a second device including a plurality of unbalance altering portions respectively for alteration of balance in different of said planes, and operative interconnections between said devices for controlling the alteration effected by different of said altering portions respectively in automatic accordance with the adjustment of different of said members, whereby to effect for each of said planes in each work piece an alteration in automatic accordance with the determination of an unbalance characteristic by said first device for the same planes in the same work piece, said interconnections each including means operative to change the ratio of the adjustment of the adjustable member of said first device relative to the alteration effected by the corresponding altering portion of said second device in different adjustment positions of the adjustable member.

26. In a machine for reducing unbalance about the intended axis of each of a plurality of work pieces and in each of a plurality of axially spaced planes in each work piece, the combination of a first device including a transmission for rotation of said work pieces on said axis and a plurality of members respectively adjustable in accordance with an unbalance characteristic in different of said planes during rotation of each work piece, a second device including a plurality of unbalance altering portions respectively for alteration of balance in different of said planes, and operative interconnections between said devices for controlling the alteration effected by different of said altering portions respectively in automatic accordance with the adjustment of different of said members, whereby to effect for each of said planes in each work piece an alteration in automatic accordance with the determination of an unbalance characteristic by said first device for the same planes in the same work piece.

27. In a machine for reducing unbalance about the intended rotation axis of each of a plurality of work pieces, the combination of a device for determining unbalance moments about said axis for each of said work pieces in each of a plurality of angularly spaced planes mutually intersecting along the axis, a device for altering the unbalance of each of said work pieces at each of a plurality of points respectively associated with different of said planes, and interconnection means operable between said devices under the control of said unbalance determining device for individually controlling the unbalance alteration effected by said altering device at each of said points in each work piece in automatic accordance with the unbalance moment determined by said determining device for the corresponding one of said planes for the same work piece.

GEORGE H. JOHNSON.